US007639614B2

(12) United States Patent
Nakagawa et al.

(10) Patent No.: US 7,639,614 B2
(45) Date of Patent: *Dec. 29, 2009

(54) DISTRIBUTION-TUNING MECHANISM FOR LINK AGGREGATION GROUP MANAGEMENT

(75) Inventors: Yukihiro Nakagawa, Cupertino, CA (US); Takeshi Shimizu, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 491 days.

This patent is subject to a terminal disclaimer.

(21) Appl. No.: 11/394,908

(22) Filed: Mar. 31, 2006

(65) Prior Publication Data

US 2006/0251106 A1 Nov. 9, 2006

Related U.S. Application Data

(60) Provisional application No. 60/670,369, filed on Apr. 12, 2005.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04J 3/02* (2006.01)
*H04L 1/00* (2006.01)
*H04L 12/26* (2006.01)
*H04L 12/16* (2006.01)
*H04L 12/28* (2006.01)

(52) U.S. Cl. .................................. 370/232; 370/542
(58) Field of Classification Search ................... 370/542
See application file for complete search history.

(56) References Cited

U.S. PATENT DOCUMENTS

| 5,959,968 | A | 9/1999 | Chin et al. |
| 6,498,781 | B1 * | 12/2002 | Bass et al. ............... 370/230.1 |
| 6,501,749 | B1 | 12/2002 | Alexander, Jr. et al. ..... 370/351 |
| 6,504,843 | B1 * | 1/2003 | Cremin et al. .............. 370/389 |
| 6,532,229 | B1 | 3/2003 | Johnson et al. ............. 370/351 |
| 6,535,489 | B1 | 3/2003 | Merchant et al. ........... 370/244 |
| 6,862,293 | B2 | 3/2005 | Lay et al. .................... 370/420 |
| 6,934,293 | B1 * | 8/2005 | DeJager et al. .............. 370/401 |
| 6,990,068 | B1 | 1/2006 | Saleh et al. |

(Continued)

FOREIGN PATENT DOCUMENTS

CA    2 459 027    12/2002

(Continued)

OTHER PUBLICATIONS

Various Authors, IEEE Standard 802.3ad, Mar. 30, 2000, IEEE, pp. 97-117 and 159-173.*

(Continued)

*Primary Examiner*—Daniel J Ryman
*Assistant Examiner*—Christopher Crutchfield
(74) *Attorney, Agent, or Firm*—Baker Botts L.L.P.

(57) ABSTRACT

In a link aggregation group aggregating a number of ports of a network element, the network element may distribute frames among the ports using a distribution function that operates according to information in the received frames. The network element may apply one of several different distribution functions and, at appropriate times, change the selected distribution function to effect a different distribution of frames among the ports.

20 Claims, 6 Drawing Sheets

U.S. PATENT DOCUMENTS

| | | | |
|---|---|---|---|
| 7,050,392 | B2 | 5/2006 | Valdevit |
| 2004/0252639 | A1 | 12/2004 | Hunter et al. ............... 370/229 |
| 2005/0213573 | A1* | 9/2005 | Shibata et al. ............. 370/389 |
| 2006/0153186 | A1* | 7/2006 | Bector et al. ................ 370/389 |

FOREIGN PATENT DOCUMENTS

| | | |
|---|---|---|
| EP | 1 300 992 A1 | 9/2003 |
| WO | WO 00/56013 | 9/2000 |
| WO | 2005/022826 A2 | 10/2005 |

OTHER PUBLICATIONS

The State Intellectual Property Office of China, Office Action, 12 pages, Dec. 21, 2007.

Lan Man Standards Committee, "Amendment to Carrier Sense Multiple Access with Collision Detection (CSMA/CD) Access Method and Physical Layer Specifications—Aggregation of Multiple Lnk Segments," IEEE Std 802.3ad-2000, 182 pages (173 plus 9 pages of title and index), Mar. 30, 2000.

Patent Pending U.S. Appl. No. 11/394,892, entitled "Purge Mechanism in Link Aggregation Group Management," by Yukihiro Nakagawa et al., 32 pages plus 6 pages of drawings, filed Mar. 31, 2006.

Patent Pending U.S. Appl. No. 11/394,960, entitled "Special Marker Message for Link Aggregation Marker Protocol," by Yukihiro Nagawa et al., 32 pages plus 6 pages of drawings, filed Mar. 31, 2006.

Patent Pending U.S. Appl. No. 11/398,257, entitled "Network Based Routing Scheme," by Takeshi Shimizu, 34 pages plus 5 pages of drawings, filed Apr. 4, 2006.

Patent Pending U.S. Appl. No. 11/278,751, entitled "Filtering Frames at an Input Port of a Switch," by Takeshi Shimizu, 24 pages plus 3 pages of drawings, filed Apr. 5, 2006.

EPO European Search Report for Application No. EP 06 00 7590, Patent No. 06007590.0-2416, Reference No. 114 574 a/npo, Applicant: Fujitsu Ltd., 8 pages, Jun. 28, 2006.

Rost et al., "Rate-Aware Splitting of Aggregate Traffic," XP-002390208, MIT Laboratory for Computer Science, pp. 1-12, Dec. 2003.

Chim et al., "Traffic Distribution over Equal-Cost-Multi-Paths," IEEE Communications Society, pp. 1207-1211, 2004.

EPO European Search Report for Application No./Patent No. 06007595.9-2416, Reference No. 114 575 a/lga, Applicant: Fijitsu Ltd., 7 pages, Jan. 8, 2006.

EPO European Search Report for Application No./Patent No. 06007588.4-2416, Reference No. 114 514 a/lga, Applicant: Fujitsu Ltd., 8 pages, Jan. 8, 2006.

Finn, "Port Aggregation Protocol," IEEE 802.3ad Workshop Group, Cisco, pp. 1-27, May 1, 1998.

USPTO Office Action for U.S. Appl. No. 11/394,892, Nakagawa, Oct. 2, 2008.

USPTO Office Action for U.S. Appl. No. 11/394,960, Nakagawa, Oct. 14, 2008.

\* cited by examiner

US 7,639,614 B2

DISTRIBUTION-TUNING MECHANISM FOR LINK AGGREGATION GROUP MANAGEMENT

RELATED APPLICATION

This Application claims the benefit under 35 U.S.C. § 119(e) of U.S. Provisional Application Ser. No. 60/670,369 entitled "Link Aggregation and Network Management Techniques," filed on Apr. 12, 2005 and incorporated by reference herein.

TECHNICAL FIELD OF THE INVENTION

The present invention relates generally to network management and, more particularly, to a distribution-tuning mechanism for link aggregation group management.

BACKGROUND OF THE INVENTION

A link aggregation group (LAG) combines multiple physical, network links into a single, logical link that provides aggregated throughput and high availability to endpoints. Communication between two endpoints occurs over the single, logical link of the LAG. The distribution of communications among physical links of the LAG may vary depending on the number and arrangement of endpoints communicating across the LAG.

SUMMARY OF THE INVENTION

In accordance with the present invention, a distribution-tuning mechanism for link aggregation group management is provided.

According to a particular embodiment, a method for distributing frames among links in a link aggregation group aggregates a plurality of physical ports as a link aggregation group, maintains multiple distribution functions each capable of mapping frames conversations such that all frames from any given conversation map to a particular one of the ports, selects one of the distribution functions, and distributes received frames among the ports in accordance with the selected distribution function. The method determines to adjust the selected distribution function and, after determining to adjust the selected distribution function, disables distribution of frames among the ports. The method selects a different one of the distribution functions and then enables distribution of received frames among the ports in accordance with the newly selected distribution function.

Embodiments of the invention provide various technical advantages. Particular embodiments provide multiple, different distribution functions to enable tuning of the LAG, which provides for more effective distribution of communications among available links. For example, communications may be distributed among links based on a distribution parameter that provides for effective distributions of the communications. According to particular embodiments, the tuning of the distribution functions is performed in response to traffic measurement, which allows for changing the distribution functions to improve the effectiveness during the communication.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
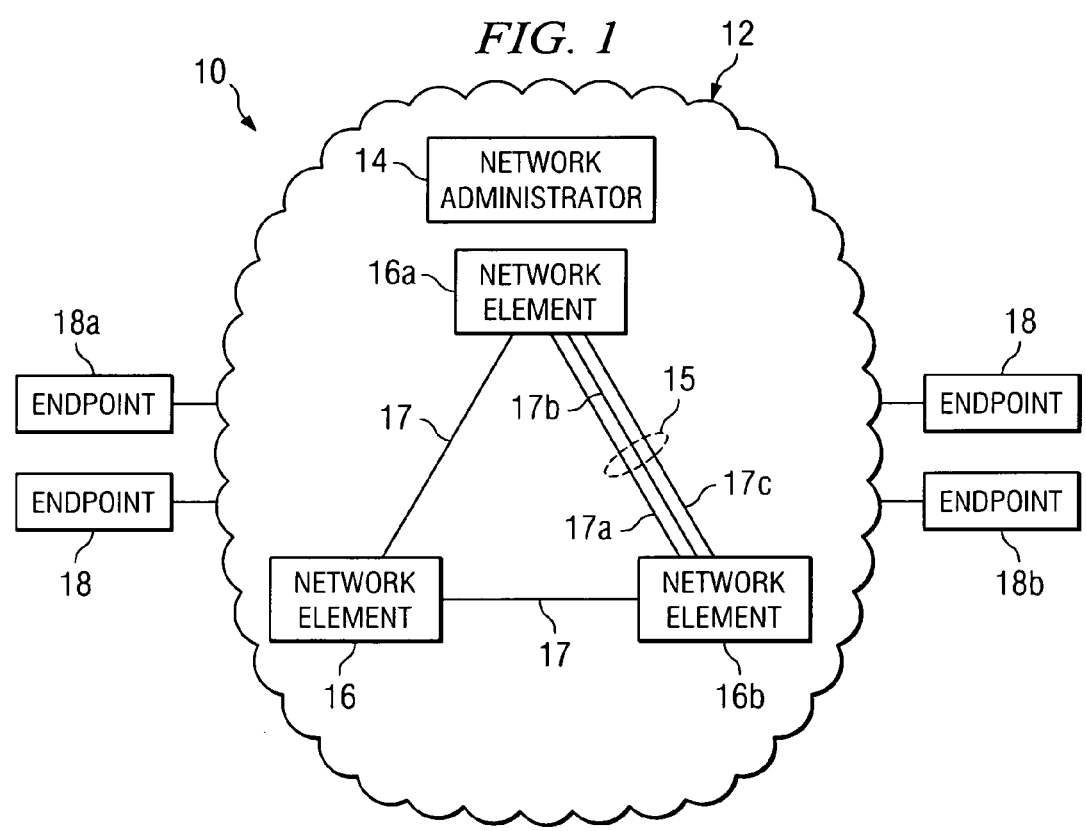
FIG. 1 illustrates a communication system that includes a LAG that implements a purge mechanism in accordance with particular embodiments of the present invention.

FIG. 1 illustrates a communication system, indicated generally at 10, that includes a LAG that implements a purge mechanism. Endpoints 18 communicate with each other over network 12 using network elements 16. In general, network elements 16 provide for the formation of a LAG to enable high speed communications between endpoints 18. To support the operation of LAGs, network elements 16 may implement techniques including: a purge mechanism to enable quick movement of conversations among links in a LAG, an extended marker protocol to enable effective movement of communications from failed or otherwise inactive links in a LAG, and tuning of distribution algorithms to help support efficient and full use links in a LAG. Network elements 16 may implement some or all of these techniques to support the operation of LAGs.

Network 12 represents communications equipment, including hardware and any appropriate controlling logic, for interconnecting elements coupled to network 12 and facilitating communication between endpoints 18. Network 12 may include a local area network (LAN), a metropolitan area network (MAN), any other public or private network, a local, regional, or global communication network, an enterprise intranet, other suitable wireline or wireless communication link, or any combination of the preceding. Further, network 12 may include any combination of gateways, routers, hubs, switches, and any other hardware, software, or a combination of the preceding that may implement any suitable protocol or communication.

In the illustrated embodiment, network 12 includes at least one network administrator 14 and multiple network elements 16. Network administrator 14 monitors and controls the behavior of network elements 16. For example, network administrator 14 provides configuration information for network elements 16. In particular, network administrator 14 may provide for the formation and administration of LAGs between network elements 16. As an example, network administrator 14 may monitor traffic within network 12 and change usage of links 17 and LAGs in response to network conditions.

Network element 16 represents network communications equipment, including appropriate controlling logic, that facilitates the communication between endpoints 18. For example, network elements 16 may include switches, routers, gateways, servers, or other suitable network equipment. According to particular embodiments, network elements 16 communicate with each other by way of high-speed electrical signals. In the illustrated embodiment, a LAG 15 is formed between network elements 16*a* and 16*b* to provide increased bandwidth and increased availability during communication. According to particular embodiments, network element 16*a* negotiates LAG 15 with another link-aggregation enabled network element 16*b*. To form LAG 15, one or more physical links 17 between network elements 16 are aggregated together.

Each link 17 represents any suitable channel that provides for the exchange of signals between network elements 16. Network elements 16 may have multiple communications occurring simultaneously on multiple links 17. Communications may be moved between links 17 while a communication is ongoing. Endpoints 18 treat LAG 15, which includes one or more physical links 17, as a single, logical link for communication. Network elements 16 may be aggregated in any suitable manner, and any suitable number of links 17 may aggregate together to form one or more LAGs 15. For example, network element 16 may have a total of eight links 17, with three links 17 aggregated to form a first LAG 15, another two links 17 aggregated to form a second LAG 15, and the remaining three links 17 operating separately and not aggregated.

Endpoints 18 represent any suitable device operable to communicate with network 12. Communication occurs between endpoints 18 by exchanging frames. Endpoints 18 exchange audio, voice, data, video, or other information in system 10 using any suitable communication protocol. Endpoints 18 may be any combination of hardware and/or software that provide communication services to a user. For example, endpoints 18 include a server, a personal computer, such as a laptop or a desktop, an Internet Protocol (IP) telephone, or any suitable device operable to communicate within system 10.

According to particular embodiments, components within system 10 communicate frames using Ethernet standards. A frame includes any suitable segmentation of data, such as packets, frames, or cells. Moreover, Ethernet and Ethernet standards include communication protocols that have been developed to handle transmission of frames between components, including any extensions, add-ons, and/or future developments that may occur with respect to these protocols. For example, Ethernet standards encompass the protocols set forth within the IEEE 802.3 and supplements.

As noted above, LAGs 15 function as single logical links formed from multiple individual physical links 17 coupling between network elements 16. During operation, two network elements 16 coupled by a particular LAG 15 may treat that LAG 15 as a single physical connection, potentially with some restrictions. As an example of operation, consider endpoint 18*a* communicating with endpoint 18*b* over network 12, and links 17*a*-17*c* between network elements 16*a* and 16*b* aggregated to form LAG 15. The communication between network element 16*a* and network element 16*b* may be referred to as a conversation. According to particular embodiments, network elements 16 maintain each conversation on a single link 17 within a given LAG 15. This can help to maintain frame ordering within a conversation. If conversations are unevenly distributed among links 17 in LAG 15, this can result in poor utilization of the full bandwidth of LAG 15. In addition, failure of one link 17 will potentially cut off conversations occurring over that link 17. Thus, in response to link failure, poor link utilization, reconfigurations, or other suitable conditions, conversations may be switched among links 17 within LAG 15.

During operation, network elements 16 may distribute received frames among links 17 in LAG 15 using any appropriate techniques. According to particular embodiments, network elements 16 implement a distribution algorithm to select a particular link 17 for each received frame. For example, network element 16 may select a particular one of links 17 in LAG 15 based on addressing information, such as source or destination address information, contained in each frame. This type of algorithm can ensure that all frames from one endpoint 18 to another endpoint 18 pass along the same link 17, and thus can ensure proper ordering of frames. This type of distribution algorithm requires no state-based memory to track distribution of conversations but can result in poor distribution of conversations among links 17. As an alternative, conversations may be distributed in a round-robin manner to links 17 in LAG 15. However, using state-based distribution techniques such as the round-robin technique requires memory to operate, since the assignment of conversations among the different links 17 must be tracked.

To reduce the need for state-based distribution techniques while obtaining advantages of even utilization of links 17, network elements 16 may support a mechanism for tuning the distribution of frames among links 17 in LAG 15. For example, given underutilization of one or more links 17 in a particular LAG 15, network element 16 can change the distribution of communications among links 17 in that LAG 15. According to a particular embodiment, network elements 16 support multiple different distribution algorithms, and network administrator 14 may select between these different algorithms in response to any appropriate network conditions. For example, network elements 16 may each provide multiple different algorithms, with each algorithm calculating a particular link 17 in LAG 15 based on some combination of source and/or destination address information. By using different combinations and portions of addressing information and potentially applying different functions, these algorithms can effect different distributions of frames among links 17 while still maintaining proper frame ordering. Network administrator 14, either automatically or manually, may change the distribution algorithms used by one or more network elements 16 to combat underutilization of LAGs 15.

In addition to providing multiple distribution algorithms, network elements 16 may further support the use of distribution parameters in combination with one or more of the distribution algorithms. These parameters can also affect the distribution function resulting from the application of a distribution algorithm. For example, a distribution parameter may shift the portion of an address considered by a particular distribution algorithm. Used in combination, a relatively small number of distribution algorithms and parameters can provide a large number of potential distribution functions.

Given the changing of distribution algorithms or parameters, failure of links 17, reconfiguration of LAGs 15, or in other appropriate circumstances, conversations may be moved among lings 17 in LAG 15. To provide for the rapid movement of communications between links 17 in LAG 15, network elements 16 may implement a purge mechanism.

Alternatively, or in addition, network elements 16 may implement an extended marker protocol in circumstances in which links 17 fail or otherwise become inactive.

For normal movement of communications between links 17 within LAG 15, network elements 16 may support a marker protocol, which may be based on a standard, such as the Institute of Electrical and Electronics Engineers, Inc. (IEEE) 802.3 Clause 43. Continuing the example from above, assume that the conversation between endpoint 18a and endpoint 18b involves a stream of frames communicated from endpoint 18a to endpoint 18b, and that network element 16a transmits these frames to network element 16b using link 17a. In response to a failure of link 17a, redistribution of conversations, or other appropriate circumstances, network element 16a may determine to move the conversation on link 17a to another link 17 in LAG 15.

To enable quick movement of the conversation (or multiple conversations), network element 16a may use a purge mechanism. In an example embodiment, the purge mechanism includes disabling distribution of additional frames to the output queues associated with link 17a and potentially the dropping of some or all frames from the output queues associated with link 17a. Network element 16a sends a message to network element 16b regarding moving the conversation. For example, network element 16a may send a marker message to network element 16b using an administrative queue associated with link 17a. When network element 16b responds to the message, network element 16 a may move the conversation to another link 17 within LAG 15. The use of marker messages and marker responses can help to ensure the appropriate ordering of frames transmitted on LAG 15. By implementing the purge mechanism, conversations can be quickly moved between links 17.

According to particular embodiments, network element 16a moves all conversations occurring on link 17a using the purge mechanism. For example, network elements 16a may move multiple conversations from link 17a to link 17c, or may spread conversations among two or more other links 17 in the given LAG 15. In addition, network elements 16 may use the purge mechanism concurrently on multiple different links 17. For example, network element 16 may use the purge mechanism on all links 17 in LAG 15 in conjunction with the redistribution of conversations among links 17 based on a change in the distribution algorithm.

In conjunction with or in other circumstances, network elements 16 may implement an extended marker protocol to further help to support the movement of communications between links 17. For example, network elements 16 may use an extended marker protocol if one of links 17 within LAG 15 fails or otherwise becomes inactive. According to particular embodiments, network elements 16 can respond to the failure or inactivation of a particular link 17 within LAG 15 by exchanging a special marker message and special marker response on an active link 17 within LAG 15. Using these special communications, network elements 16 can quickly move communications from failed links 17 without relying on timeouts or other mechanisms. According to particular embodiments, the special marker messages and responses use fields within traditional marker messages and response, but provide additional information understandable only by appropriately enabled network elements 16.

More detailed descriptions of particular embodiments for implementing purge mechanisms, extended marker protocols, and distribution tuning are discussed below. However, while specific examples are provided within this description, it should be understood that they are provided for illustrative purposes only, and system 10 contemplates network elements 16 applying any suitable techniques. Moreover, the particular embodiment illustrated and described with respect to system 10 is not intended to be all-inclusive or limiting. While system 10 and elements within system 10 are depicted as having a certain configuration and arrangement of elements, it should be noted that these are logical depictions, and the components and functionality of system 10 may be combined, separated and distributed as appropriate both logically and physically. Also, the functionality of system 10 and elements within system 10 may be provided by any suitable collection and arrangement of components.

Figure 2:
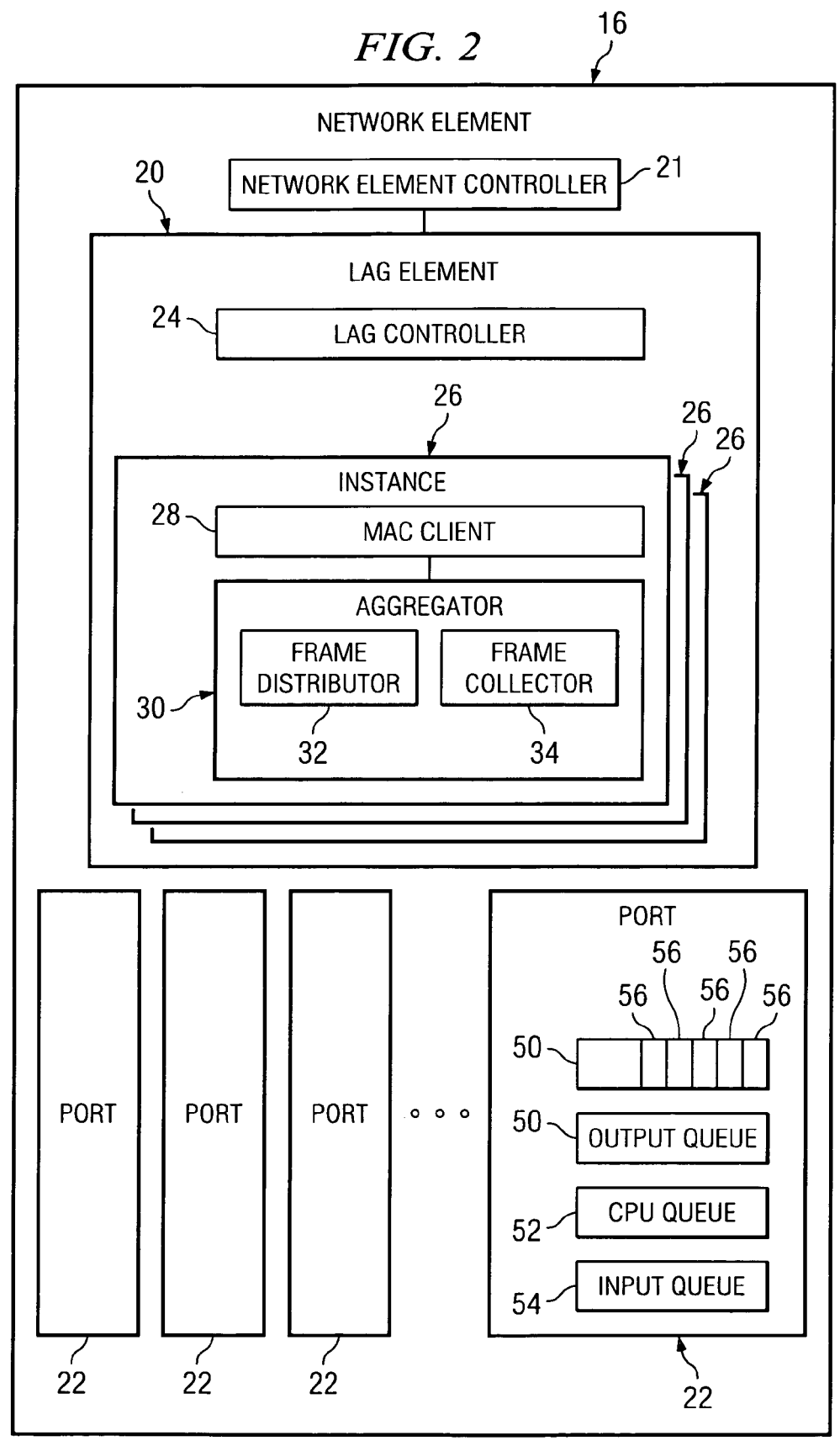
FIG. 2 illustrates an example network element from the system of FIG. 1.

FIG. 2 illustrates an example network element 16 from system 10 of FIG. 1. Network element 16 may include any appropriate combination and arrangement of components and modules. In the illustrated embodiment, network element 16 includes a LAG element 20 that facilitates the formation of LAG 15, a network element controller 21 to manage the operation of components within network element 16, and ports 22 that communicate over links 17, which aggregate to form LAG 15. LAG element 20 includes a LAG controller 24 and one or more LAG modules 26. Each LAG module 26 includes a Media Access Control (MAC) client 28 and an aggregator 30, which includes a frame distributor 32 and a frame collector 34. Port 22 includes one or more output queues 50, a central processing unit (CPU) queue 52, and an input queue 54 that facilitate the communication of frames 56. In general, the components within network element 16 facilitate the communication between endpoints 18 over network 12. More specifically, the components within network element 16 provide a purge mechanism that facilitates moving of conversations between links 17 in LAG 15.

Network element controller 21 represents hardware, including any suitable controlling logic, capable of managing the operation of other components or modules within network element 16. For example, network element controller 21 may operate to load and execute software or other controlling logic from any suitable source.

Ports 22 represent any suitable physical interface, including appropriate controlling logic, for connecting to components in system 10. In an embodiment, ports 22 represent the physical interface between network elements 16. Ports 22 that transmit communications to other ports 22 may be referred to as source ports 22. Alternatively, ports 22 that receive communications from other ports 22 may be referred to as destination ports 22. Any port 22 may behave as a source port 22 and a destination port 22 during communication when information is exchanged bidirectionally. Ports 22 may include any suitable state of operation. For example, ports 22 may have a disabled state, a learning state, and a forwarding state. The learning state may occur when a frame comes into port 22, and the forwarding state may occur during normal traffic operation when frames come in and go out of port 22. Network element 16 includes any suitable number of ports 22. Each port 22 may have an associated physical address. For example, each port 22 may be assigned a unique, globally administered MAC address. Ports 22 may be coupled by links 17, which represent a communication channel between ports 22. Each port 22 may correspond to one link 17. Communications between endpoints 18 may be moved among links 17 within LAG 15. Moving communications between links 17 provides for, among other things, load balancing and maintaining the availability of the conversation if one or more links 17 in LAG 15 fail.

The queues within port 22 further facilitate communications. Output queues 50 receive frames 56 from frame distributor 32 and holds frames 56 for transmission to network element 16. According to particular embodiments, output queue 50 provides for transmitting frames 56 on a first-in-first-out basis. Input queue 54 receives frames 56 and messages from network element 16 and provides frames 56 and messages to frame collector 34. CPU queue 52 provides messages and responses in the marker protocol and the extended marker protocol for moving the conversation among links 17 in LAG 15.

Element 20 represents any suitable combination of hardware and/or software that facilitates link aggregation. Element 20 includes controller 24 and one or more modules 26. Controller 24 represents hardware, including any suitable controlling logic, capable of managing the operation of other components or modules within LAG element 20. For example, controller 24 facilitates the creation of LAG 15, monitors the behavior of an existing LAG 15, and provides any suitable functionality to facilitate link aggregation. In particular embodiments, controller 24 determines which links 17 may be aggregated, aggregates links 17, binds ports 22 to aggregator 30, and monitors LAG 15. In another embodiment, network administrator 14 manually controls the variables of link aggregation.

Each negotiated LAG 15 has an associated module 26, which may be a logical depiction, in element 20. Module 26 facilitates functionality of its associated LAG 15 and provides for the implementation of varying features within LAG 15. For example, when links 17 are active, communications occurring on link 17a within LAG 15 may be moved to link 17c using module 26. As another example, if link 17a fails during communication, the communication on link 17a may be moved to link 17c using module 26.

Each module 26 includes a MAC client 28 and an aggregator 30. MAC client 28 represents the logical media access controller for LAG 15, and aggregator 30 supports the communication of frames over links 17 and the implementation of features within LAG 15. To support the transmission and receipt of frames 56 between network elements 16, aggregator 30 is bound to one or more ports 22.

While frames 56 are transmitted and received by aggregator 30, the order of frames 56 is maintained during the communication. Frame distributor 32 and frame collector 34 facilitate the communication of frames 56. Frame distributor 32 distributes frames 56 from endpoints 18 over port 22 using links 17 that form LAG 15. Frame distributor 32 ensures frames 56 of a particular conversation are passed to port 22 to prevent misordering of frames 56. Frame distributor 32 implements any suitable distribution algorithm that chooses link 17 to use for the transmission of any given frame 56 or set of frames 56 that belong to a conversation. The selected distribution algorithm may prevent misordering of frames 56 of a conversation and the duplication of frames 56. Based on the selected distribution algorithm, frames of a given conversation are forwarded to port 22. The distribution algorithm may be based on a destination address, a source address, a combination of the destination address and the source address, the address of the receiving port 22, or any other appropriate criteria.

Frame collector 34 receives frames 56 from ports 22 and delivers the received frames 56 towards endpoint 18. According to particular embodiments, frames 56 are forwarded out another port 22, which may directly connect to endpoint 18 or may be on the path. For example, frame collector 34 receives frames 56 from a set of links 17 that form LAG 15. For any given port 22, frame collector 34 passes frames 56 to MAC client 28 in the order received from port 22. Frame collector 34 may select frames 56 received from aggregated ports 22 in any order. Because frame distributor 32 ensures frames 56 maintain their order, frame collector 34 may not need to perform any reordering of frames 56 received from multiple links 17 and frame ordering is maintained for the communication.

As discussed above, network elements 16 support a marker protocol and an extended marker protocol. Both protocols provide for communications among aggregations. Using these protocols, for example, frame distributor 32 of network element 16a generates and distributes a marker, using marker protocol or the extended marker protocol, to frame collector 34 of network element 16b. Frame collector 34 of network element 16b distributes a marker response, using marker protocol or extended marker protocol, to frame distributor 32 of network element 16a. Messages, including a marker and a marker response, in marker protocol may have any suitable format. As discussed above, marker protocol provides for moving conversations between links 17 within LAG 15. Using marker protocol, controller 24 generates and transmits a marker on one or more active links 17 within LAG 15. Frame collector 34 in the receiving network element 16 provides a maker response to frame distributor 32 in the transmitting network element 16. During the process of moving conversations from one link 17, conversations on other links 17 may continue without interruption. Alternatively, network element 16 may use the marker protocol to shift conversations among two or more links 17 in the associated LAG 15. For example, controller 24 may generate and transmit marker messages on one or more links 17 and, after receiving responses, move conversations occurring on those links 17.

The marker and marker response in the extended marker protocol (or a special marker and a special marker response, respectively) may have any suitable format. In an exemplary embodiment, a message in the extended marker protocol includes the following format:

---

Destination Address = MAC address of the destination port
Source Address = MAC address of a non-failed source port
Type = 0x8809
Subtype = Marker Protocol
Version = 0x01
TLV: Marker Information = 0x01, Marker Response = 0x02, Special Marker = 0x03, Special Marker Response = 0x04
Information Length = 0x10 ($16_{10}$)
Requester Port
Requester System
Requester Transaction ID = Failed port for special messages
Pad = 0x0000
Terminator = 0x00
Terminator Length = 0x00
Reserved
Frame Check Sequence

---

As discussed above, the extended marker protocol may be used when link 17 fails, or is otherwise inactivated, and conversations are to be moved to one or more active links 17. In accordance with one embodiment of the extended marker protocol, frame distributor 32 in network element 16a in provides a special marker on an active link 17 within LAG 15. Frame collector 34 in network element 16b provides a special marker response to frame distributor 32. During the process of moving conversations from one link 17, conversations on other links 17 may continue without interruption. In the alternative, network element 16 may use the extended marker protocol to shift conversations among two or more links 17 in the associated LAG 15. For example, controller 24 may generate and transmit marker messages on one or more links 17 and, after receiving responses, move conversations occurring on those links 17.

In accordance with one embodiment, the extended marker protocol provides for identifying the failed or inactive link 17 in the message. For example, the message format may include the MAC address of port 22 associated with failed link 17 in the Requester Transaction ID field. As another example, the TLV field provides for identifying the message as a special marker or a special marker response. Using the extended marker protocol, frame distributor 32 generates the special marker using an active link 17 within LAG 15. Frame collector 34 transmits a special marker response to frame distributor 32, which confirms there are no ongoing frames 56 before moving the conversations. During the process of moving the conversations from failed or inactive link 17, communications on other links 17 may continue without interruption.

While the embodiment illustrated and the preceding description focus on a particular embodiment of network element 16, system 10 contemplates network element 16 having any suitable combination and arrangement of components and modules supporting a purge mechanism in LAG 15. Thus, the functionalities performed by the particular elements illustrated may be separated or combined as appropriate, and some or all of these elements may be implemented by logic encoded in media. For example, the functions of frame distributor 32 and frame collector 34 may be separated and/or combined as appropriate and any of their operations may be implemented by suitable control logic. Also, while shown as a single module, the functionalities of some or all of the illustrated components of network element 16 may be distributed among other elements of system 10.

Figure 3:
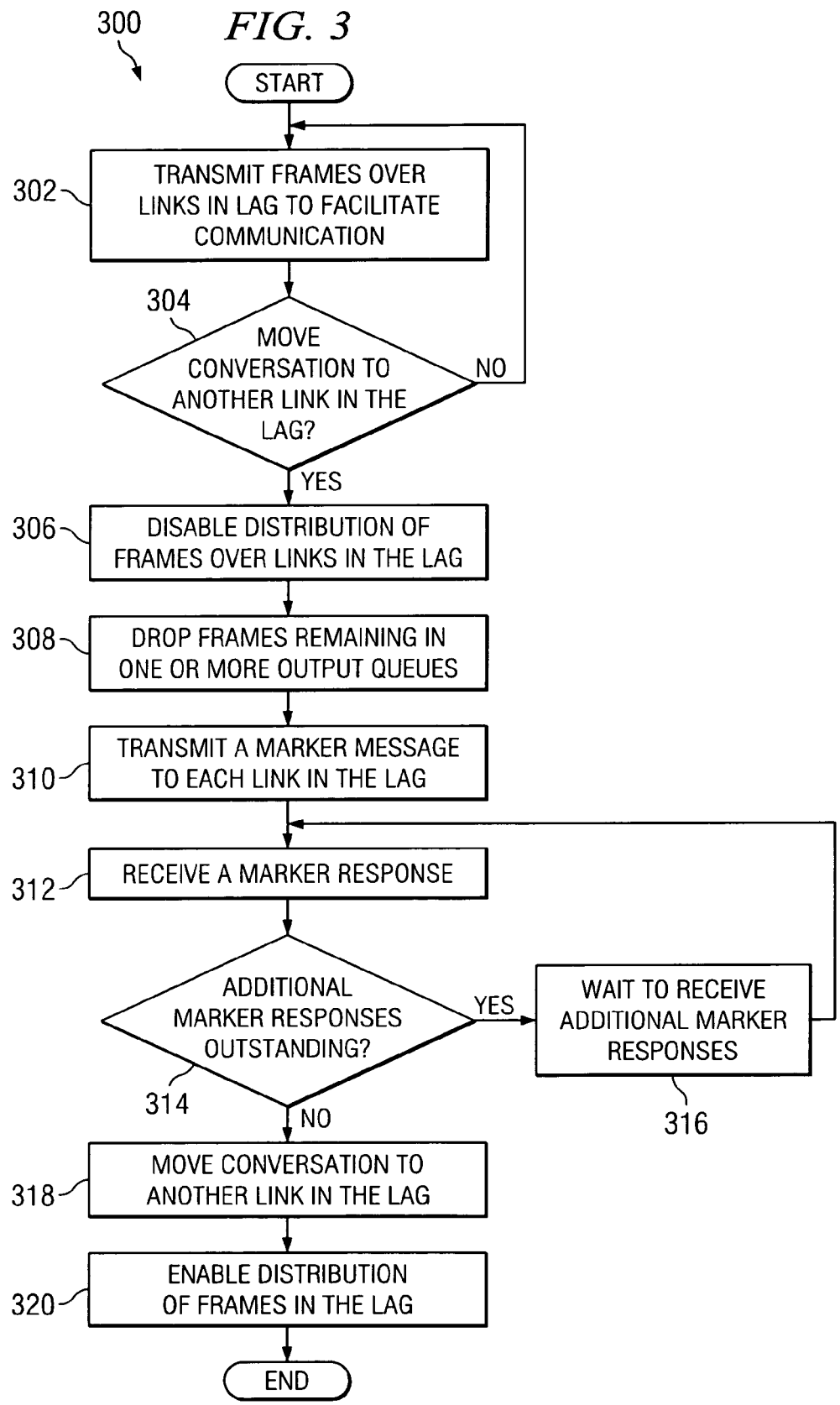
FIG. 3 is a flowchart illustrating a method for moving a conversation between ports with the purge mechanism using a frame distributor at a transmitting network element.

FIG. 3 is a flowchart 300 illustrating a method for moving a conversation between ports 22 with the purge mechanism using frame distributor 32 at transmitting network element 16. The following description of flowchart 300 is provided with reference to frame distributor 32 of network element 16 as described above. However, any appropriate element or combination of elements may implement the steps as described below.

To facilitate communication between endpoints 18 using LAG 15, frame distributor 32 transmits frames 56 over links 17 in LAG 15 at step 302. During communication, it is determined whether to move one or more conversations to another link 17 in LAG 15 at step 304. If the conversations are not to be moved, frame distributor 32 continues to distribute frames 56 over links 17 in LAG 15. On the other hand, if it is determined to move the conversations, frame distributor 32 disables distribution of frames 56 over links 17 in LAG 15 at step 306. For example, disabling distribution prevents additional frames 56 from being placed in output queue 50. Frame distributor 32 goes into a purge state and causes the remaining frames 56 in output queues 50 to be dropped at step 308. During this purge state, frame distributor 32 may discard all frames 56 intended for the disabled link 17, counting on upper layer recovery mechanisms to handle the dropped frames. Accordingly, CPU queue 52 may begin sending messages in the marker protocol without waiting for the transmission of remaining frames 56 in output queue 50. According to particular embodiments, during the purge state, output queues 50 may continue to process and transmit control frames, such as bridge protocol data unit (BPDU) frames.

At step 310, frame distributor 32 transmits a marker message to each link 17 in LAG 15. For example, frame distributor 32 generates the marker messages and places the marker messages in each CPU queue 52 for transmission on links 17. The marker message may include any suitable information to inform network element 16 that the communication may be moved from one link 17 in LAG 15 to another link 17 in LAG 15. According to the example format of a message in the marker protocol provided above, if the TLV has a value of 0x01, the message is identified as a marker message.

Frame distributor 32 receives a marker response at step 312. It is determined at step 314 whether additional marker responses are outstanding. If frame distributor 32 may receive additional responses, the method proceeds to step 316 and frame distributor 32 waits to receive additional marker responses. From step 316, additional marker responses may be received at step 312, and the method continues. In an embodiment, frame distributor 32 waits to receive marker responses from each link 17 that received a marker message. In this embodiment, frame distributor 32 waits varying periods of time depending on the number of additional, outstanding marker responses. In another embodiment, frame distributor 32 initiates a timer while waiting to receive additional marker responses. Frame distributor 32 may use the timer to provide a configurable amount of time when waiting for additional marker responses. The timer may be configured for any suitable period. Using the timer, frame distributor 32 would discontinue waiting for additional marker responses, even if additional marker responses are outstanding.

However, if additional marker responses are not outstanding, the method proceeds to step 318. At step 318, the conversation is moved to another link 17 in LAG 15. Frame distributor 32 returns to a non-purge state and enables distribution of frames 56 in LAG 15 at step 320. Conversations then continue over active links 17 in LAG 15.

The preceding flowchart 300 illustrates an exemplary operation for frame distributor 32 in network element 16 to move one or more conversations between ports 22 using the purge mechanism. However, the preceding flowchart 300 and accompanying description illustrate only an exemplary method of operation. Thus, many of the steps in flowchart 300 may take place simultaneously and/or in different orders than as shown. In addition, frame distributor 32 may use methods with additional steps, fewer steps, and/or different steps, so long as the methods remain appropriate.

Figure 4:
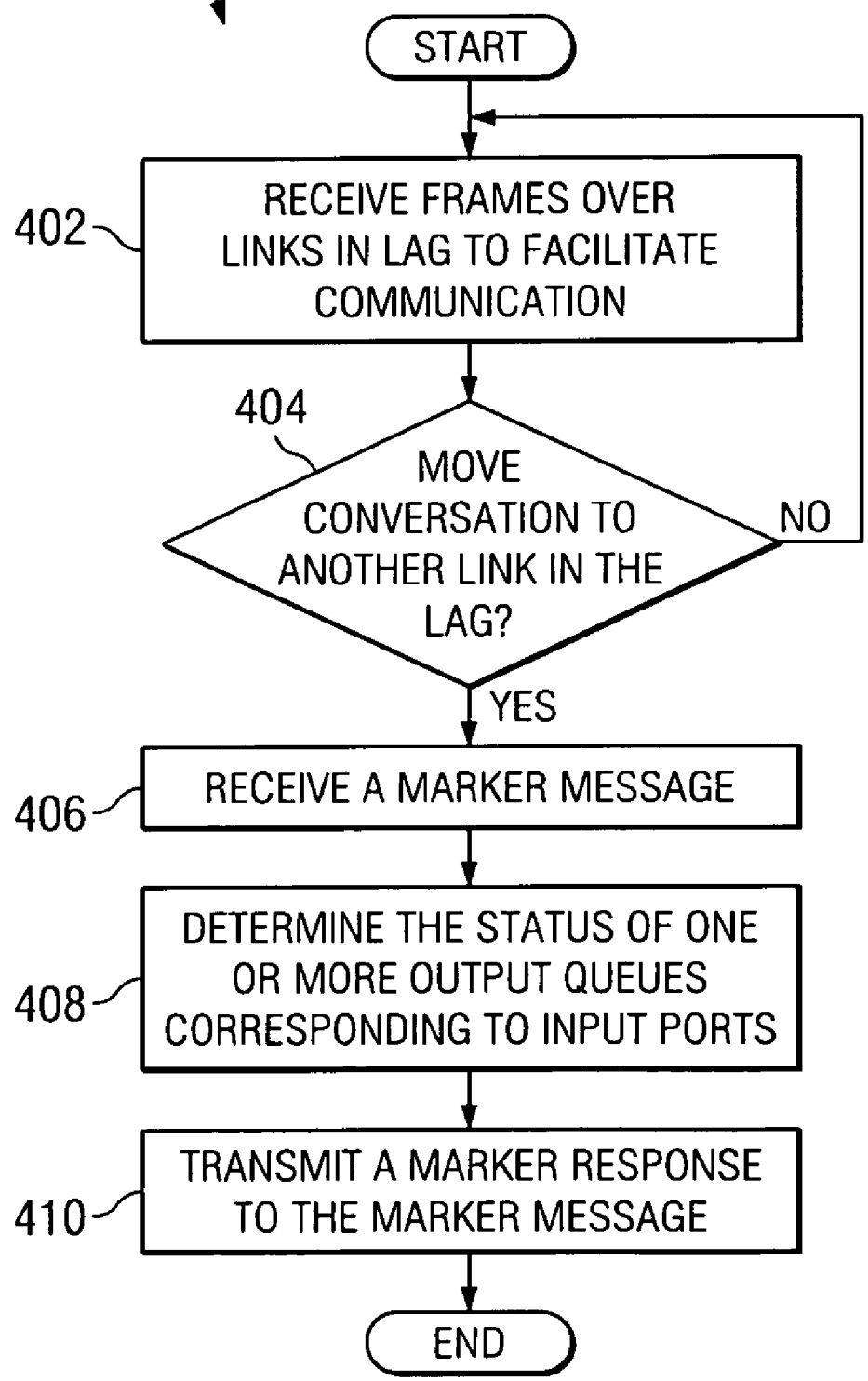
FIG. 4 is a flowchart illustrating a method for responding to a determination to move the conversation between ports with the purge mechanism using a frame collector at a receiving network element.

FIG. 4 is a flowchart 400 illustrating a method for responding to a determination to move the conversation between ports 22 with the purge mechanism using frame collector 34 at receiving network element 16. The following description of flowchart 400 is provided with reference to frame collector 34 of network element 16 as described above. However, any appropriate element or combination of elements may implement the actions as follows.

To facilitate communication between endpoints 18 using LAG 15, frame collector 34 receives frames 56 over links 17 in LAG 15 at step 402. During communication, it is determined whether to move the communication to another link 17 in LAG 15 at step 404. If the conversation is not to be moved, frame collector 34 continues to receive frames 56 over links 17 in LAG 15. On the other hand, if it is determined to move the conversation, frame collector 34 receives a marker message at step 406. For example, a determination is made to move the conversation to another link 17 in LAG 15, and frame distributor 32 sends a marker message to frame collector 34 in another network element 16. At step 408, frame collector 34 determines the status of one or more output queues 50 corresponding to one or more input ports 22. For example, controller 24 checks the status of output queues 50 using an interrupt or by reading an output queue status register. Additionally, frame collector 34 may determine the status of output queues 50 corresponding to each input port 22.

At step 410, frame collector 34 transmits a marker response to frame distributor 32. The marker response includes any suitable information that responds to the marker message to move the communication between links 17. For example, the marker response confirms there are no frames 56 to be processed before moving the communication. According to the example format of a message in the marker protocol, if the TLV has a value of 0x02, the message is identified as a marker response.

As with flowchart 300, flowchart 400 and the accompanying description illustrate only an exemplary method of operation, and frame collector 34 and/or other suitable components contemplate using any suitable techniques to move communication between ports 22 using the purge mechanism. Thus, many of the steps in flowchart 400 may take place simultaneously and/or in different orders as shown. In addition, frame collector 34 may use methods with additional steps, fewer steps, and/or different steps, so long as the methods remain appropriate.

Figure 5:
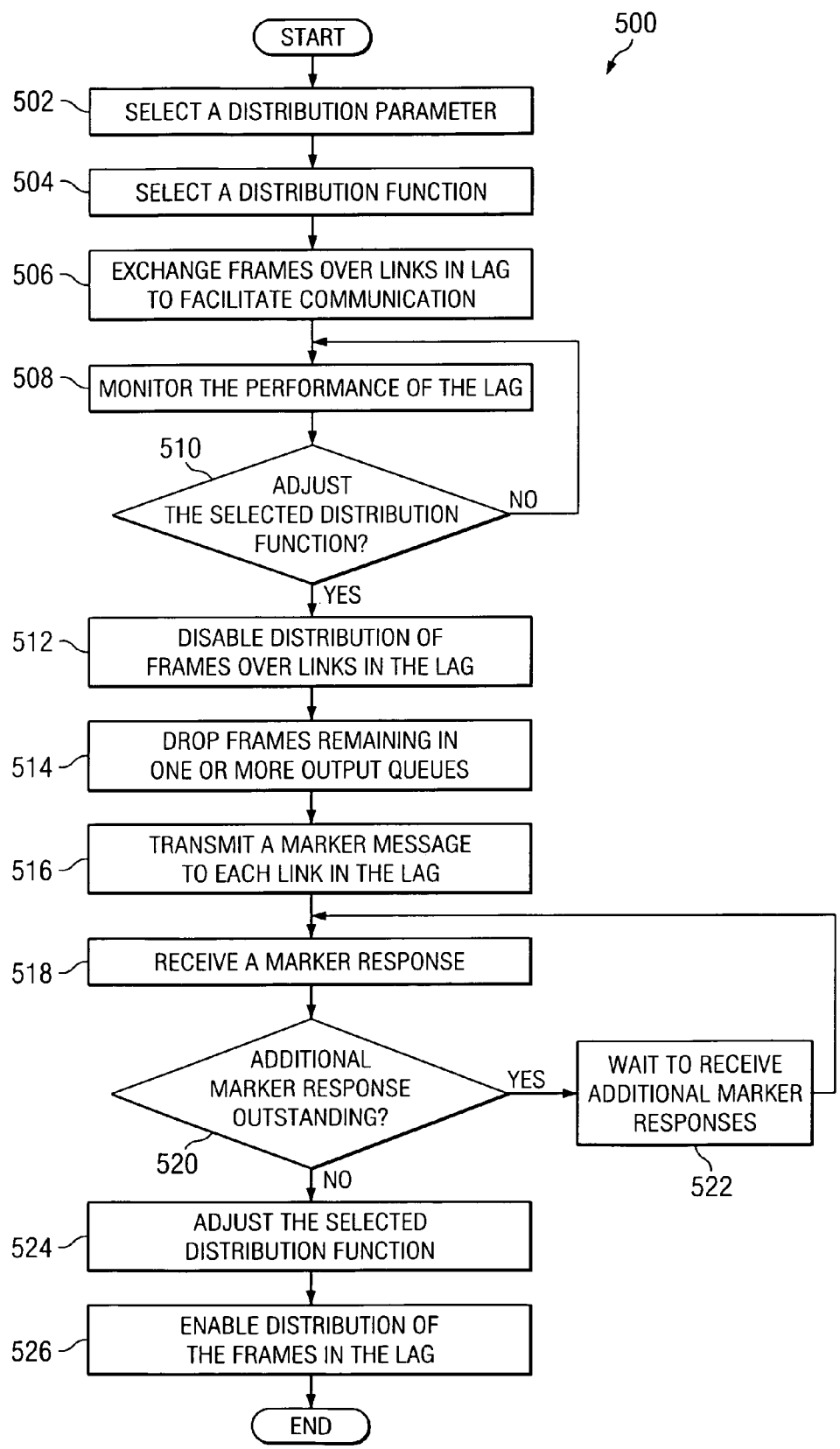
FIG. 5 is a flowchart illustrating a method for implementing a distribution tuning mechanism for the LAG.

FIG. 5 is a flowchart 500 illustrating a method for implementing a distribution tuning mechanism in LAG 15. The following description of flowchart 500 is provided with reference to network element 16 as described above. However, any appropriate element or combination of elements may implement the steps as described below.

To facilitate communication between endpoints 18 using LAG 15, a distribution parameter is selected at step 502. Multiple distribution parameters may be provided to use in determining how to distribute the conversation among links 17. Any suitable distribution parameter may be selected. For example, distribution parameters include a measurement of link activity, the configuration of system 10, or the status of network element 16. Any suitable element of system 10 may select the distribution parameter, for example, network element 16 or network administrator 14 may select the distribution parameter. Upon selecting the distribution parameter, a distribution function is selected at step 504. The distribution function provides for distributing conversations among links 17 according to the selected distribution parameter. In an embodiment, each distribution parameter is associated with one or more distribution functions. In this embodiment, the distribution function is selected from among the associated distribution functions. Any distribution function associated with the selected distribution parameter may be selected. As with the distribution parameter, any suitable element of system 10 may select the distribution function, such as network element 16 or network administrator 14. At step 506, network element 16 exchanges frames 56 over links 17 in LAG 15.

The selected distribution parameter and the distribution function may be adjusted during communication. The performance of LAG 15 is monitored during step 508. Monitoring the performance includes monitoring any suitable parameter of system 10, such as the activity over links 15 or the effectiveness of exchanging frames 56 between ports 22. For example, the parameter as determined by the selected distribution parameter is monitored. If the measurement of link activity is selected as the distribution parameter, link activity is monitored during step 508. At step 510, it is determined whether to adjust the selected distribution function. For example, network administrator 14 may detect that conversations are unevenly distributed among links 17 within LAG 15. If it is determined not to adjust the selected distribution function, the performance of LAG 15 continues to be monitored from step 508.

Alternatively, if it is determined to adjust the selected distribution function, network element 16 initiates the process for implementing the distribution-tuning mechanism. For example, the distribution function may be adjusted if the performance of LAG 15 may be improved by using a different distribution function. As an example, if the measurement of link activity is the selected distribution parameter, network element 16 may adjust the distribution function if link 17 is underutilized. At step 512, network element 16 disables distribution of frames 56 over links 17 in LAG 15. For example, disabling distribution prevents additional frames 56 from being placed in output queue 50. At step 514, network element 16 drops frames 56 remaining in output queues 50. Accordingly, CPU queue 52 may begin sending messages in the marker protocol without waiting for the transmission of remaining frames 56 in output queue 50. While frames 56 are being dropped, output queues 50 may continue to process and transmit control frames, such as BPDU frames.

At step 516, network element 16 transmits a marker message to each link 17 in LAG 15. For example, network element 16 generates the marker message, and CPU queue 52 sends the marker message. The marker message may include any suitable information to inform the destination network element 16 that conversations may be redistributed among links 17. According to the example format of a message in the marker protocol, if the TLV has a value of 0x01, the message is identified as a marker message.

Network element 16 receives a marker response at step 518. It is determined at step 520 whether additional marker responses are outstanding. If network element 16 may receive additional responses, the method proceeds to step 522 and network element 16 waits to receive additional marker responses. From step 522, additional marker responses may be received at step 518, and the method continues. In an embodiment, network element 16 waits to receive marker responses from each link 17 that received a marker message. In this embodiment, network element 16 waits varying periods of time depending on the number of additional outstanding marker responses. In another embodiment, network element 16 initiates a timer while waiting to receive additional marker responses. Network element 16 may use the timer to provide a configurable period to wait for additional marker responses. The timer may be configured for any suitable period. Using the timer, network element 16 would discontinue waiting for additional marker responses when the timer expires even if additional marker responses are outstanding. In yet another embodiment, network element 16 may retransmit marker messages on links 17 on which marker responses remain outstanding.

However, if additional marker responses are not outstanding, the method proceeds to step 524. At step 524, the selected distribution function is adjusted. As mentioned above, adjusting the selected distribution function to another distribution function associated with the distribution parameter may improve the performance of LAG 15. Using the marker protocol, the ordering of frames 56 within a conversation may be maintained even though the distribution function is adjusted. As noted above, any suitable element of system 10 may adjust the selected distribution function. For example, network administrator 14, either automatically or through manual intervention, may adjust the distribution function. As another example, an automated administrative tool detects the performance of LAG 15 and automatically adjusts LAG 15 by varying the selected distribution function. After adjustment of the distribution among links 17, network element 16 enables distribution of frames 56 in LAG 15 at step 526. The conversations continue over links 17 in LAG 15 based on the adjusted distribution function.

The preceding flowchart 500 illustrates an exemplary operation for network element 16 to implement a distribution tuning mechanism in LAG 15. However, the preceding flowchart 500 and accompanying description illustrate only an exemplary method of operation. For example, network element 16 may adjust the distribution parameter based on the monitoring of the performance of LAG 15. Adjusting the distribution parameter also provides for improving the performance of LAG 15 by distributing the conversations differently among link 17. As another example, network element 16 adjusts the distribution parameter and the distribution function to improve the performance of LAG 15. Many of the steps in flowchart 500 may take place simultaneously and/or in different orders than as shown. In addition, network element 16 may use methods with additional steps, fewer steps, and/or different steps, so long as the methods remain appropriate.

Figure 6:
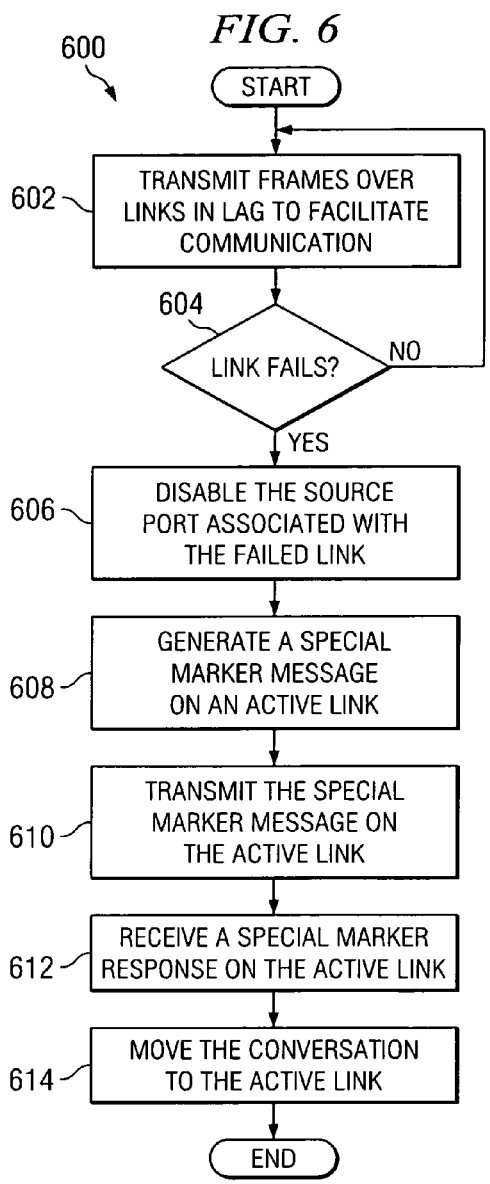
FIG. 6 is a flowchart illustrating a method for implementing a special marker message using the frame distributor at the transmitting network element.

FIG. 6 is a flowchart 600 illustrating a method for implementing a special marker message using frame distributor 32 at transmitting network element 16. The following description of flowchart 600 is provided with reference to frame distributor 32 of network element 16 as described above. However, any appropriate element or combination of elements may implement the steps as described below.

To facilitate communication between endpoints 18 using LAG 15, frame distributor 32 transmits frames 56 over links 17 in LAG 15 at step 602. Frame distributor 32 monitors for failure or other inactivation of links 17 at step 604. If links 17 do not fail, frame distributor 32 continues to distribute frames 56 over links 17 in LAG 15. On the other hand, if a particular link 17 does fail, frame distributor 32 disables source port 22 associated with the failed link 17 at step 606.

At step 608, frame distributor 32 generates a special marker message on an active link 17. The special marker message provides for moving the conversation to an active link using the extended marker protocol. Frame distributor 32 transmits the special marker message on active link 17 in LAG 15 at step 610. For example, frame distributor 32 generates the special marker message, and CPU queue 52 sends the special marker message. The special marker message may include any suitable information to inform network element 16 that link 17 has failed and the communication will be moved to one or more active links 17. According to the example format of a message in the extended marker protocol, if the TLV has a value of 0x03, the message is identified as a special marker message. Also, the exemplary format as described above also provides the MAC address of the failed port 22 in the Requester Transaction ID field.

Frame distributor 32 receives a special marker response at step 612. According to the example format of a message in the extended marker protocol, if the TLV has a value of 0x04, the message is identified as a special marker response. The conversation is moved to one of the active links 17 at step 614. Frame distributor 32 enables distribution of frames 56 in LAG 15, and the conversations continue over links 17 in LAG 15.

The preceding flowchart 600 illustrates an exemplary operation for implementing a special marker message using a frame distributor 32 of the network element 16. However, the preceding flowchart 600 and accompanying description illustrate only an exemplary method of operation. For example, frame distributor 32 removes the failed link 17 from LAG 15 when the conversation is moved to an active link 17 in LAG 15. Removing failed link 17 provides for moving conversations to an active link 17 while other conversations on other links 17 remain the same. As another example, extended marker protocol may be used in combination with marker protocol. In this example, conversations may be redistributed among active links 17. Many of the steps in flowchart 600 may take place simultaneously and/or in different orders than as shown. In addition, frame distributor 32 may use methods with additional steps, fewer steps, and/or different steps, so long as the methods remain appropriate.

Figure 7:
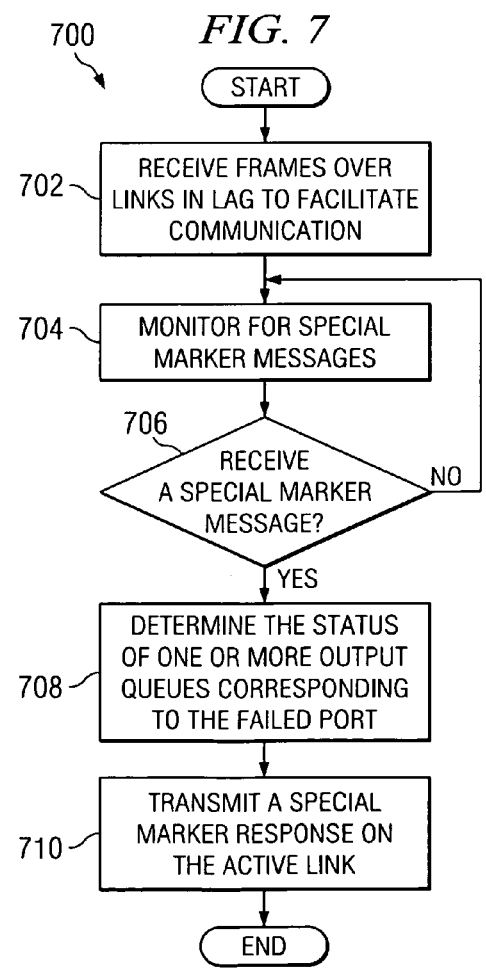
FIG. 7 is a flowchart illustrating a method for responding to a special marker message using the frame collector at the receiving network element.

FIG. 7 is a flowchart 700 illustrating a method for responding to the special marker message using frame collector 34 at receiving network element 16. The following description of flowchart 700 is provided with reference to frame collector 34 of network element 16 as described above. However, any appropriate element or combination of elements may implement the actions as follows.

To facilitate communication between endpoints 18 using LAG 15, frame collector 34 receives frames 56 over links 17 in LAG 15 at step 702. Frame collector 34 monitors for special marker messages at step 704. For example, in conjunction with normal handling of management messages received on links 17, frame collector 34 may detect a special marker message sent from frame distributor 32 of a remote network element 16 to inform frame collector 34 of a failed or inactive link 17. If a special marker message is not received at step 706, frame collector 34 continues to monitor for special marker messages at step 704. If a special marker message is received, the method continues to step 708.

At step 708, frame collector 34 determines the status of one or more output queues 50 corresponding to port 22 associated with failed link 17. For example, controller 24 checks the status of output queues 50 using an interrupt or by reading an output queue status register. At step 710, frame collector 34 transmits a special marker response to frame distributor 32 at the transmitting network element 16. The special marker response includes any suitable information that responds to the special marker message to move the conversation between links 17 following failure of link 17. For example, the special marker response confirms there are no frames 56 to be processed before moving the conversation. According to the example format of a message in the extended marker protocol, if the TLV has a value of 0x04, the message is identified as a special marker response. Also, the exemplary format as described above also provides the MAC address of the failed port 22 in the Requester Transaction ID field.

Flowchart 700 and the accompanying description illustrate only an exemplary method of operation, and frame collector 34 and/or other suitable components contemplate using any suitable techniques to respond to the special marker message in link aggregation marker protocol. Thus, many of the steps in flowchart 700 may take place simultaneously and/or in different orders as shown. In addition, frame collector 34 may use method with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for distributing frames among links in a link aggregation group comprising:
    aggregating a plurality of physical ports as a link aggregation group;
    maintaining a plurality of distribution functions, each of the distribution functions capable of mapping frames for a plurality of conversations such that all frames from any given one of the conversations map to a particular one of the ports;
    selecting one of the distribution functions as a selected distribution function;
    distributing received frames among the ports in accordance with the selected distribution function;
    determining to adjust the selected distribution function;

after determining to adjust the selected distribution function, disabling distribution of frames among the ports;
after disabling distribution of frames among the ports, dropping frames remaining in one or more output queues;
selecting a different one of the distribution functions as the selected distribution function; and
enabling distribution of received frames among the ports in accordance with the selected distribution function after selecting the different one of the distribution functions as the selected distribution function.

2. The method of claim 1, further comprising:
monitoring performance of the link aggregation group to detect underutilization of one or more links in the link aggregation group; and
determining to adjust the selected distribution function in response to the performance.

3. The method of claim 1, further comprising, after determining to adjust the selected distribution function:
transmitting a marker message on each of the ports; and
receiving a marker response on each of the ports prior to enabling distribution of received frames.

4. The method of claim 1, wherein determining to adjust the selected distribution function comprises receiving a notice from a network management device.

5. The method of claim 4, wherein the notice identifies one of the distribution functions.

6. The method of claim 1, wherein the selected distribution function operates in conjunction with a distribution parameter, the method further comprising selecting a value for the distribution parameter.

7. The method of claim 6, further comprising:
monitoring performance of the link aggregation group to detect underutilization of one or more links in the link aggregation group; and
determining to adjust the value for the distribution parameter in response to the performance; and
modifying the value of the distribution parameter.

8. The method of claim 1, wherein each of the distribution functions operates to distribute frames among the ports based on addressing information specified in the frames.

9. A network element comprising:
a plurality of ports;
an aggregator corresponding to two or more of the ports aggregated into a link aggregation group, the aggregator comprising a frame collector and a frame distributor;
a memory operable to maintain a plurality of distribution functions, each of the distribution functions capable of mapping frames for a plurality of conversations such that all frames from any given one of the conversations map to a particular one of the aggregated ports;
the frame distributor operable to select one of the distribution functions as a selected distribution function, to distribute received frames among the aggregated ports in accordance with the selected distribution function, to determine to adjust the selected distribution function, after determining to adjust the selected distribution function, to disable distribution of frames among the aggregated ports, after disabling distribution of frames among the aggregated ports to drop frames remaining in one or more output queues, to select a different one of the distribution functions as the selected distribution function, and to enable distribution of received frames among the aggregated ports in accordance with the selected distribution function after selecting the different one of the distribution functions as the selected distribution function.

10. The network element of claim 9, further comprising a controller operable to monitor performance of the link aggregation group to detect underutilization of one or more links in the link aggregation group and to determine to adjust the selected distribution function in response to the performance.

11. The network element of claim 9, wherein:
the frame distributor is further operable, after determining to adjust the selected distribution function, to transmit a marker message on each of the aggregated ports and to enable distribution of received frames after receiving an indication from the frame collector; and
the frame collector is operable to receive a marker response on each of the aggregated ports and, in response, to provide the indication to the frame distributor.

12. The network element of claim 9, wherein the frame distributor is further operable to determine to adjust the selected distribution function in response to receiving a notice from a network management device.

13. The network element of claim 12, wherein the notice identifies one of the distribution functions.

14. The network element of claim 9, wherein the selected distribution function operates in conjunction with a distribution parameter, the frame distributor further operable to select a value for the distribution parameter.

15. The network element of claim 9, wherein each of the distribution functions operates to distribute frames among the aggregated ports based on addressing information specified in the frames.

16. A computer readable medium encoding software for distributing frames among links in a link aggregation group, which when executed by a computer causes the computer to perform the steps of:
aggregating a plurality of physical ports as a link aggregation group;
maintaining a plurality of distribution functions, each of the distribution functions capable of mapping frames for a plurality of conversations such that all frames from any given one of the conversations map to a particular one of the ports;
selecting one of the distribution functions as a selected distribution function;
distributing received frames among the ports in accordance with the selected distribution function;
determining to adjust the selected distribution function;
after determining to adjust the selected distribution function, disabling distribution of frames among the ports;
after disabling distribution of frames among the ports, dropping frames remaining in one or more output queues;
selecting a different one of the distribution functions as the selected distribution function; and
enabling distribution of received frames among the ports in accordance with the selected distribution function after selecting the different one of the distribution functions as the selected distribution function.

17. The computer readable medium of claim 16, further operable when executed to perform the steps of:
monitoring performance of the link aggregation group to detect underutilization of one or more links in the link aggregation group; and
determining to adjust the selected distribution function in response to the performance.

18. The computer readable medium of claim 16, wherein the selected distribution function operates in conjunction with a distribution parameter, the logic further operable when executed to identify a value for the distribution parameter.

19. The computer readable medium of claim 16, wherein each of the distribution functions operates to distribute frames among the ports based on addressing information specified in the frames.

20. A network element comprising:

means for aggregating a plurality of physical ports as a link aggregation group;

means for maintaining a plurality of distribution functions, each of the distribution functions capable of mapping frames for a plurality of conversations such that all frames from any given one of the conversations map to a particular one of the ports;

means for selecting one of the distribution functions as a selected distribution function;

means for distributing received frames among the ports in accordance with the selected distribution function;

means for determining to adjust the selected distribution function;

means for, after determining to adjust the selected distribution function, disabling distribution of frames among the ports; after disabling distribution of frames among the ports, means for after disabling distribution of frames among the ports, dropping frames remaining in one or more output queues;

means for selecting a different one of the distribution functions as the selected distribution function; and means for enabling distribution of received frames among the ports in accordance with the selected distribution function after selecting the different one of the distribution functions as the selected distribution function.

* * * * *